Sept. 12, 1950     H. B. OSBORN, JR     2,521,740
ELECTROMAGNETIC CUTTING TORCH

Filed Oct. 30, 1947     2 Sheets-Sheet 2

INVENTOR.
HARRY B. OSBORN, Jr
By Alfred C Body
Attorney

Patented Sept. 12, 1950

2,521,740

UNITED STATES PATENT OFFICE 2,521,740

ELECTROMAGNETIC CUTTING TORCH

Harry B. Osborn, Jr., University Heights, Ohio, assignor to The Ohio Crankshaft Company, Cleveland, Ohio, a corporation of Ohio Application October 30, 1947, Serial No. 783,055

3 Claims. (Cl. 219—1)

The present invention relating as indicated to an electromagnetic cutting torch is an improvement on the invention shown and described in application Serial No. 714,051, filed December 4, 1946, by J. W. Williamson, for Means and Method for Concentration of Induction Heating, which application is owned by the assignee of this application.

In the aforesaid application it has been shown that by providing the single turn secondary of a high frequency transformer with longitudinal conductors and a generally conical end having a suitable core, a large amount of heating flux can be concentrated in a relatively small part of a metal article lying at or adjacent to the vertex of the core. The part of the article being heated rapidly attains an oxidizing temperature, and if sufficient oxygen is present, the heated portion is rapidly burned away, even more rapidly than when the metal is submitted to an oxidizing oxy-acetelene flame. When such cutting is accomplished by induced current there is less heating of adjacent articles and of the surrounding atmosphere, the operation is cleaner, there is less danger of fires and the equipment is lighter, more compact and easier to transport.

Accordingly, the present invention has for its chief object the provision of means for rapidly cutting away by oxidation a selected part of an article without heating it by combustible materials. Another object has been to attain oxidizing temperature by electric means. A further object has been to provide means for accomplishing such cutting away without use of inflammable materials. A still further object has been to provide oxidizing cutting means which is small, light and easily transported. Other objects will become apparent from the following description in which reference is made to the accompanying drawings:

Figure 1:
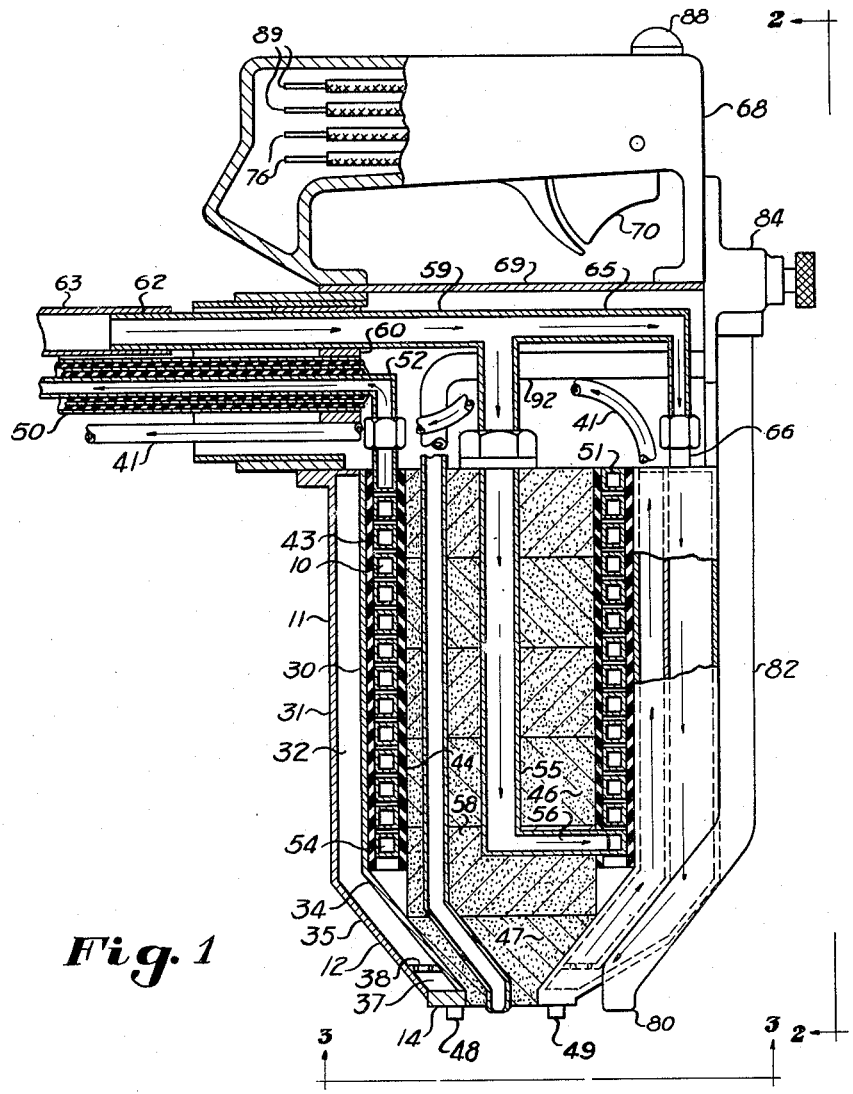
Fig. 1 is a longitudinal section taken generally through the center of the torch and corresponds generally with Fig. 8 of the above identified application Serial No. 714,051.
Figure 2:
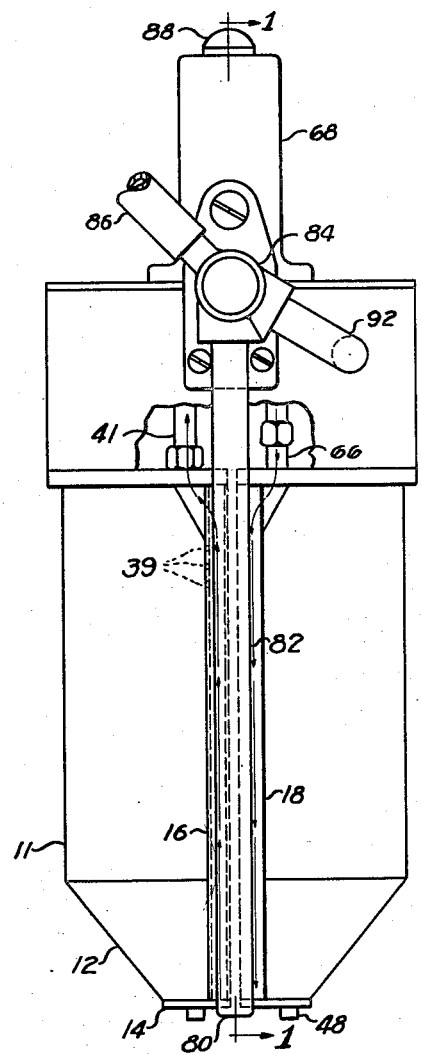
Fig. 2 is an elevation taken as indicated at 2—2 of Fig. 1.
Figure 3:
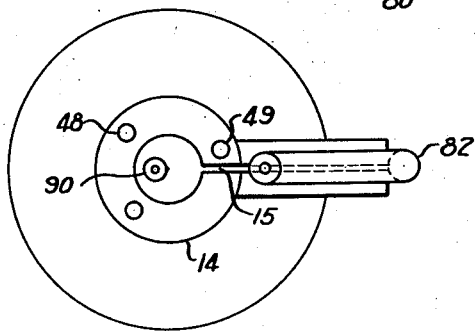
Fig. 3 is an end elevation of the torch as indicated at 3—3 of Fig. 1.

Referring now to the figures the principal elements comprising the heating structure of the torch include primary coil 10 which is of helical form and a generally cylindrical secondary 11 having a conical end 12. The primary usually contains about fifteen turns of rectangular hollow copper tubing spaced by suitable insulation. The cylindrical portion 11 of the secondary comprises two generally concentric copper tubes 30 and 31 spaced from each other to provide passage 32 for cooling fluid. The conical portion 12 comprises coaxial conical copper shells 34 and 35 spaced from each other and joined to tubes 30 and 31 respectively to form a continuation of passage 32. Copper ring 14 which serves as a substantially reverse short circuit conductor for current generated in cylindrical portion 11, closes the space between shells 34 and 35 at their lower ends, and when power is applied to primary 10, focuses heating flux in the desired part of an article to be heated. A longitudinal cleft 15 having a width usually of the order of one-sixteenth of an inch or less extends entirely through one side of the secondary to prevent the current generated in the cylindrical portion from being short circuited therein and to cause this current to seek a circuit through ring 14 in a reverse direction as hereinbefore pointed out. The space between the inner and outer shells of the secondary is sealed off at the cleft to retain the cooling fluid which is delivered thereto from a passage extending longitudinally through current accumulator bar 18 through annular passage 37, from which most of it is distributed through orifices in annular plate 38 into the lower part of space 32 and a part of it is directed into the lower end of bar 16. The part entering space 32 after cooling shells 30 and 31 passes through openings 39 into an upper part of bar 16 where it mingles with the fluid which entered at the lower end of this bar. From bar 16 this fluid flows through tube 41 to a waste outlet or to a cooling means if it is desired to save and re-circulate the cooling fluid. The distribution of cooling fluid through passages in plate 38 and the arrangement of passages 39 insures a substantially uniform temperature in the inner and outer walls of the secondary. Bars 16 and 18 which are secured to the edges of cleft 15 and spaced from each other by a distance usually equal to the width of the cleft, are insulated from each other by a sheet of mica or other suitable insulation which usually extends in far enough radially to enter the cleft between the edges of the secondary.

A generally cylindrical shell 43, usually of mica or similar material, separates the primary from the secondary which supports it. Another cylindrical shell 44 of suitable insulating material fits closely within the primary 10 to locate and support blocks 46 which are usually made of powdered iron and which serve as a core for the primary and secondary. The lower block 47 has a tapered surface to engage inner surfaces of conical shell 34 which holds it in a central position. Core member 47 may extend out into or a little beyond flush relation with the lower face of ring 14 to bring it into relatively close proximity with the article to be heated or may be recessed so that the part to be heated may enter a part of ring 14. Spacing pins 48 which are usually made of lava and inserted in recesses in ring 14, establish the proximity of the ring and the core with the piece to be heated. One of these pins such as 49 is usually placed close to cleft 15 so as to prevent a shortcircuiting of ring 14 by the piece to be heated.

Power is supplied by flexible water-cooled coaxial cable 50. Power leads of this cable are connected across the helical primary 10, one being connected to the upper coil 51 by connector 52 and the other to the lower coil 54 by conductor 55 which extends centrally through powdered iron blocks 46 and then radially at 56 through a notch cut in block 58 to meet coil 54. The outer conducting layer of coaxial cable 50 is connected to conductor 55 through cooling water pipe 59 and metallic strip 60. The inner conducting layer of the coaxial cable may be brazed directly onto connector 52. To supply cooling fluid to primary 10 conductor 55 is hollow and by means of pipe 59 is joined at 62 to flexible fluid conduit 63. Core blocks 46 are passed over conductor 55 with an easy sliding fit. The physical properties of the blocks and of conductor 55 are such that when power is applied and the temperatures of the blocks and of the conductor rise the blocks contract relative to the conductor and the bores of the blocks come into efficient heat conducting contact with the conductor so that the fluid in the conductor cools the blocks. Also joined to the flexible fluid conduit 63 is tubing 65 which receives part of the fluid from conduit 63 and delivers it through fitting 66 to bar 18 of secondary 11. From bar 18 this fluid is delivered to annular passage 37 as hereinbefore explained.

For convenience of use, the secondary 11, which serves as an enclosing support for the primary 10, is provided with a handle 68 attached thereto by adapter 69 so that a mechanic can transport and operate the heating unit. The end of the cable 50 which carries the power wires and cooling fluid conduits is secured to the adapter. Trigger 70 operates a switch within handle 68 which, through conductors 76 connected to a suitable relay, closes a switch connecting the source of high frequency heating current to the primary 10, and high frequency heating flux is focused in a small section of the article to be cut, the focusing ring 14 being held in close proximity with this section. As soon as the small section of metal adjacent to ring 14 reaches oxidizing temperature, a pencil point stream of oxygen under pressure, usually of the order of 125 pounds per square inch, is directed from nozzle 80 against the particular part of the heated area which it is desired to cut away. This oxygen is supplied to nozzle 80 through tube 82 into which it is metered by valve 84, which valve is usually carried in a convenient location on handle 68 as shown. Tube 82 may be located in various positions, but usually is carried along conductors 16 and 18 to bring nozzle 80 into a favorable position for convenient operation of the torch. The oxygen is supplied to valve 84 through flexible tube 86 which is usually within or attached to the conduit supplying current and cooling fluid to the primary and secondary coils of the heater.

When the metal to be cut away has reached oxidizing temperature, the oxygen is supplied almost instantaneously by button 88 which operates a switch in handle 68 which, through wires 89, actuates a relay to open a main valve at the oxygen source to deliver the oxygen to tube 86. The metal at oxidizing temperature ignites and the heat of combustion of the metal augments the heat produced by induced currents to rapidly cut a desired passage or slot through the article to be cut. To cut a slot of any desired form the torch is moved in such direction that the oxygen nozzle 80 trails the heating ring 14, that is the torch as shown in Fig. 1 would be moved generally to the left.

To augment or as a substitute for nozzle 80, an additional nozzle 90 is sometimes provided to deliver the cutting oxygen into the space bounded by ring 14. In this case tube 92 which supplies this nozzle passes through core members 46 and 47 and is directed through a wall of the cover 69 where it is connected to valve 84 as shown or is connected to a separate valve carried on this cover or in other convenient location.

It will be apparent to those skilled in the art that changes can be made in the construction of the apparatus and in the method herein disclosed without departing from the spirit of this invention or from the scope of the following claims, which claims are for the purpose of defining those parts of the invention which differ from earlier contributions to the art.

What I claim is:

1. An electromagnetic cutting torch for cutting or forming a recess in a metallic article of manufacture comprising means for directing a high-frequency flux in a direction transverse to the plane of the metallic surface to be cut, including an inductor loop having an axis perpendicular to said surface, a conduit extending generally parallel and in close-spaced relationship to the axis of said loop and terminating in close proximity to the side of the inductor loop adjacent the surface of the article, means for supplying an oxidizing medium to the other end of said conduit, said inductor loop inducing high-frequency, high-density electric currents to flow in the plane of the surface of the article to heat same to an oxidizing temperature, said conduit supplying an oxidizing medium when said metal has reached the oxidizing temperature to burn an opening in the surface of the article whereupon the paths of the current in the plane of the surface are then distorted by the presence of the opening such that they tend to concentrate at one side of the opening more than elsewhere in the article.

2. An electromagnetic cutting torch for heating and cutting an electrically-conducting metallic article of manufacture including a magnetically-permeable core member having an end adapted to be disposed in close-spaced relationship with a surface of said article, a conductor member about said core and adapted to have high-frequency currents flowing therein to generate a high-frequency flux in said core, said flux entering said article transverse to the core-adjacent surface to induce high-frequency currents to flow in the plane of the surface of the article, said core having a conduit extending generally centrally thereof and opening at one end adjacent the surface of said article and at the other end communicating with a source of an oxidizing medium, said inductor causing currents to flow in a concentrated uniform manner in said article prior to a recess being formed therein by the flowing of an oxidizing gas against the surface after heating and, subsequently, causing currents to flow more concentrated about one side of the recess than the other.

3. The method of cutting a metallic, electrically-conducting article of manufacture comprising flowing high-frequency flux transversely relative to the plane of and into the surface to be cut to induce high-frequency currents to flow in the plane of the surface until the temperature of said surface reaches an oxidizing temperature, continuing the flowing of such flux and simultaneously directing an oxidizing agent against said heated surface to oxidize the surface until a recess is formed therein, moving said source of flux and oxidizing agent progressively to shift the current induced in the article and concentrate same more about one side of the recess than the other to provide a greater heating thereat.

HARRY B. OSBORN, Jr.

REFERENCES CITED

The following references are of record in the file of this patent:

UNITED STATES PATENTS

| Number | Name | Date |
| --- | --- | --- |
| 650,124 | Coleman | May 22, 1900 |
| 857,247 | Menne | June 18, 1907 |
| 1,324,337 | Chapman et al. | Dec. 9, 1919 |
| 2,308,860 | Clark | Jan. 19, 1943 |
| 2,412,797 | Berliner | Dec. 17, 1946 |

FOREIGN PATENTS

| Number | Country | Date |
| --- | --- | --- |
| 580,877 | Great Britain | Sept. 23, 1946 |